United States Patent [19]

Imai et al.

[11] Patent Number: 5,280,423
[45] Date of Patent: Jan. 18, 1994

[54] OPERATION CONTROL DEVICE FOR WASHING MACHINES

[75] Inventors: Masahiro Imai, Seto; Yosiyuki Makino, Nishi; Hiroshi Ikeda, Seto, all of Japan

[73] Assignee: Kabushiki Kaisha Toshiba, Kawasaki, Japan

[21] Appl. No.: 750,611

[22] Filed: Aug. 27, 1991

[30] Foreign Application Priority Data

Aug. 27, 1990 [JP] Japan ................................ 2-226067
Aug. 27, 1990 [JP] Japan ................................ 2-226069
Aug. 28, 1990 [JP] Japan ................................ 2-226916

[51] Int. Cl.$^5$ ..................... G06F 15/46; D06F 33/02
[52] U.S. Cl. .................................... 364/140; 68/12.02; 68/12.23; 364/132; 364/184
[58] Field of Search ................. 364/140–147, 400, 131–136, 138, 139, 184–187; 68/12.01, 12.02, 12.12, 12.23; 34/43–45; 134/56 R, 57 R, 57 D, 57 DC, 56 D, 58 R, 58 D

[56] References Cited

U.S. PATENT DOCUMENTS

| 4,253,148 | 2/1981 | Johnson et al. | 364/133 |
| 4,335,591 | 6/1982 | Gillespie | 68/12.23 |
| 4,380,698 | 4/1983 | Butts | 364/132 X |
| 4,418,398 | 11/1983 | Hornung | 364/141 X |
| 4,503,575 | 3/1985 | Knoop et al. | 68/12.23 X |
| 4,611,295 | 9/1986 | Fowler | 364/141 X |

Primary Examiner—Joseph Ruggiero
Attorney, Agent, or Firm—Limbach & Limbach

[57] ABSTRACT

An operation control device for a washing machine incorporating electrical equipment such as a motor and electromagnetic valves includes a sub microcomputer for controlling the electrical equipment incorporated in the washing machine and a host microcomputer supplying control commands to the sub microcomputer to control the same. The host microcomputer determines whether or not a control sequence of the washing machine has reached a stage where the incorporated electrical equipment are to be controlled by the sub microcomputer and then, supplies a reset signal to the sub microcomputer to reset the same when a result of the determination signifies a negative.

7 Claims, 11 Drawing Sheets

OPERATION CONTROL DEVICE FOR WASHING MACHINES

BACKGROUND OF THE INVENTION

This invention relates generally to a washing machine controlled by a microcomputer, and more particularly to an operation control device for the washing machine including a host microcomputer and a sub microcomputer operated in response to a control command from the host microcomputer so that equipment such as a motor is controlled by these microcomputers in association.

Conventional washing machines are provided with a microcomputer-based operation control circuit. Control and operation equipment such as electromagnetic valves and a motor incorporated in the washing machine are controlled based on operation of the microcomputer. These equipment incorporated in the washing machine will be referred to as electrical equipment hereafter. A single microcomputer is usually provided in the conventional washing machine.

The cost of a one-chip microcomputer employed in the conventional washing machines has recently been increased progressively as the increases in the number of terminals and the memory capacity of the microcomputer. A plurality of, for example two, microcomputers have recently been employed in the washing machine for the purpose of cost reduction. In such a case a sub microcomputer controls the electrical equipment based on control commands from a host microcomputer.

However, the following defects can be found in the conventional washing machine employing a plurality of microcomputers. First, influences of noise or the like cause data error in the control commands transferred from the host microcomputer to the sub microcomputer as the increase in the number of microcomputers. Furthermore, the probability of occurrence of runaway of the microcomputers is increased. Consequently, the electrical equipment is abnormally operated and in the extreme, the washing machine runs into danger.

Second, if the runaway of the sub microcomputer should occur, a washing machine motor would keep running even when the operation command for running it is not supplied from the host microcomputer. In this case the washing machine motor could not be interrupted by the host microcomputer.

Third, where noise invades a transmission line during transmission of serial data between the computers or an error occurs in the output of the host microcomputer, the serial data lacks a plurality of bits thereof or error data invades the data on the transmission line. As the result of occurrence of such a situation, the subsequent serial data transfer timing is deviated by the lacked bits of data or increased data, resulting in change in the contents of the transferred data.

SUMMARY OF THE INVENTION

Therefore, an object of the present invention is to provide an operation control device for a washing machine wherein a plurality of microcomputers are incorporated and the electrical equipment incorporated in the washing machine can be prevented from being abnormally operated because of runaway of the microcomputers, the abnormal condition of the data transmission line, and data missing due to noise.

In accordance with a first aspect, the present invention provides an operation control device for a washing machine incorporating electrical equipment such as a motor and electromagnetic valves, the operation control device comprising a sub microcomputer for controlling the equipment incorporated in the washing machine and a host microcomputer supplying control commands to the sub microcomputer to control the same, the host microcomputer including first means for determining whether or not a control sequence of the washing machine has reached a stage where the incorporated equipments are to be controlled by the sub microcomputer and second means for supplying a reset signal to the sub microcomputer to reset the same when a result obtained by the first means signifies a negative, and third means for supplying a reset release signal to the sub microcomputer when the control sequence has reached the stage where the incorporated equipment is to be controlled by the sub microcomputer, thereby releasing the sub microcomputer from the reset state.

The sub microcomputer is maintained in the reset state in the stages of the control sequence other than the stage where the electrical equipment are controlled by the sub microcomputer. Consequently, the probability of occurrence of runaway of the microcomputers can be reduced, which can prevent the electrical equipment from being abnormally operated.

In the above-described operation control device, the sub microcomputer may include fourth means for determining whether or not interruption of signal transmission from the host microcomputer to the sub microcomputer is continuous for a predetermined period of time and fifth means for interrupting operation of the incorporated equipment when a result obtained by the fourth means is an affirmative.

The electrical equipment being driven under control of the sub microcomputer are interrupted when the condition that data is not transferred from the host microcomputer to the sub microcomputer continues for the predetermined period of time. The runaway of the host microcomputer is included in the condition that data is not transferred from the host microcomputer to the sub microcomputer for the predetermined period of time or more. Consequently, where the program runaway occurs in the host microcomputer, an abnormal condition that the electrical equipment are kept driving can be prevented.

In a third aspect, the invention provides an operation control device for a washing machine incorporating electrical equipment such as a motor and electromagnetic valves, the operation control device comprising a sub microcomputer having a plurality of output ports for controlling the electrical equipment, a host microcomputer supplying control commands to the sub microcomputer to control the same, the host microcomputer having a plurality of output ports, and interruption means for collating an output logical value of one of the output ports of the host microcomputer with a logical output value of one of the output ports of the sub microcomputer for determining whether or not each of the host and sub microcomputers is in an abnormal condition, the interruption means interrupting operation of the incorporated electrical equipment when determining that either of the host and sub microcomputers is in the abnormal condition, the interruption means being configured in a circuit independent from both of the host and sub microcomputers.

In accordance with a fourth aspect, the invention provides an operation control device for a washing machine incorporating equipments such as a motor and electromagnetic valves, the operation control device comprising a sub microcomputer for controlling the equipments, the sub microcomputer having a plurality of output ports, a host microcomputer supplying control commands to the sub microcomputer to control the same, the host microcomputer having a plurality of output ports, and interruption means for collating an output logical value of one of the output ports of the host microcomputer with a logical output value of one of the output ports of the sub microcomputer for determining whether or not each of the host and sub microcomputers is in an abnormal condition, the interruption means interrupting operation of the incorporated equipments when determining that either of the host and sub microcomputers is in the abnormal condition.

In the case where the control signals for running the incorporated equipment are caused to be continuously generated as the result of runaway of the sub microcomputer, the command from the host microcomputer is given priority in the interruption means. Consequently, the incorporated equipment being driven can be interrupted.

In a fourth aspect, the invention provides an operation control device for a washing machine incorporating electrical equipment such as a motor and electromagnetic valves, the operation control device comprising a sub microcomputer for controlling the electrical equipment, the sub microcomputer having a plurality of input and output ports, a host microcomputer having a plurality of input and output ports, the host microcomputer sequentially transferring serial data from a predetermined one of the output ports thereof to a predetermined one of the input ports of the sub microcomputer, the host microcomputer including means for supplying data transfer preparation command signals from the output ports other than the predetermined output port to the input ports of the sub microcomputer other than the predetermined output port prior to the data transfer to the predetermined input port of the sub microcomputer, the sub microcomputer including means for inputting input data after the data transfer preparation command signal is supplied thereto.

Where any part of data transferred from the host microcomputer is missing or error data invades the data transmission line, the defective data is input to the sub microcomputer. However, when the subsequent data transfer preparation signal is delivered from the host microcomputer to the sub microcomputer, the subsequent data is input to the sub microcomputer and the previous defective data is canceled by the subsequent data. Consequently, the data input can be promptly recovered to its normal condition.

Other objects of the present invention will become obvious upon understanding of the illustrative embodiments about to be described or will be indicated in the appended claims. Various advantages not referred to herein will occur to one skilled in the art upon employment of the invention in practice.

BRIEF DESCRIPTION OF THE DRAWINGS

Embodiments of the invention will be described with reference to the accompanying drawings in which.

DESCRIPTION OF THE PREFERRED EMBODIMENTS

Figure 1:
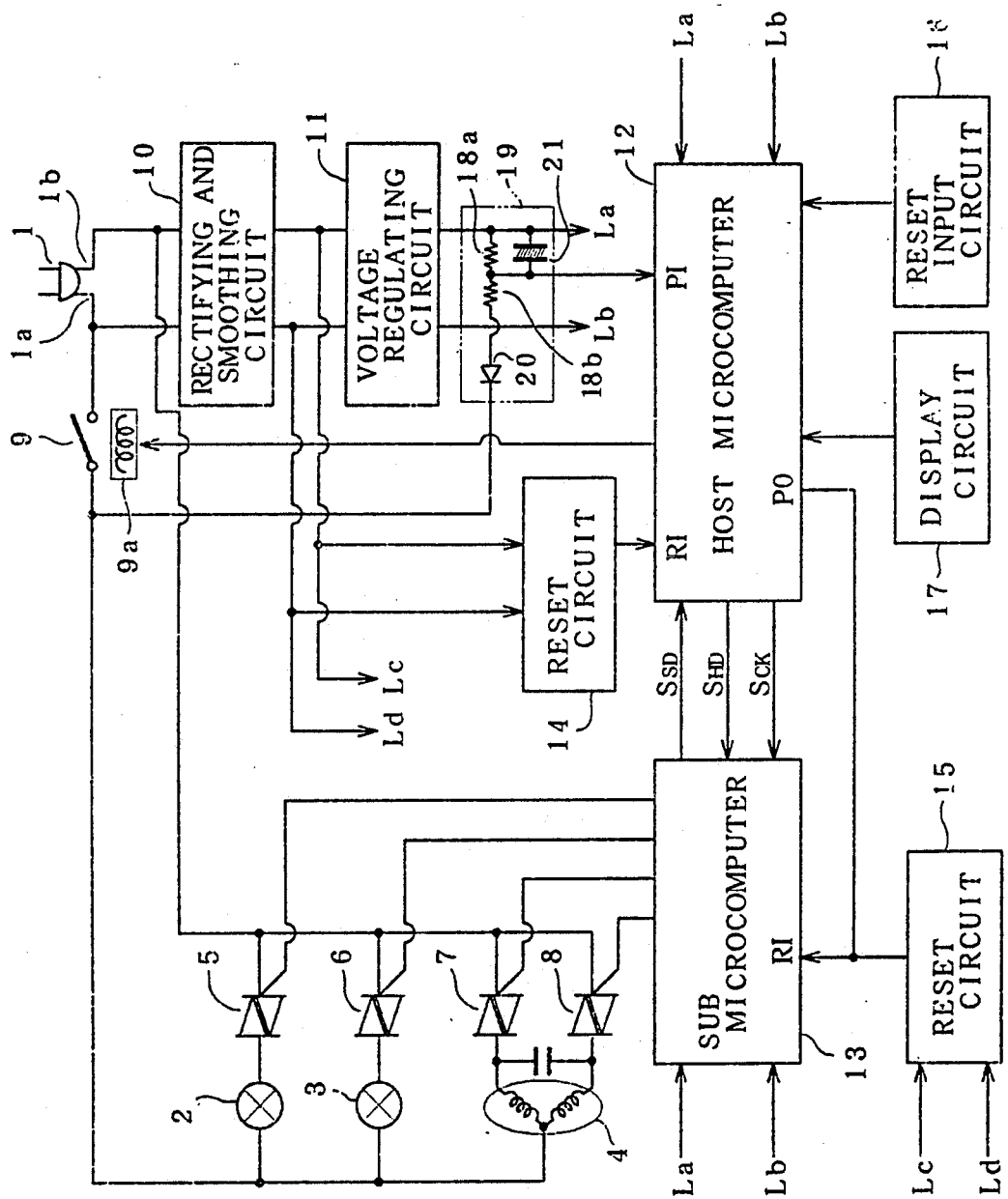
FIG. 1 is a circuit diagram showing an electrical arrangement of the washing machine in accordance with a first embodiment of the invention.
Figure 2:
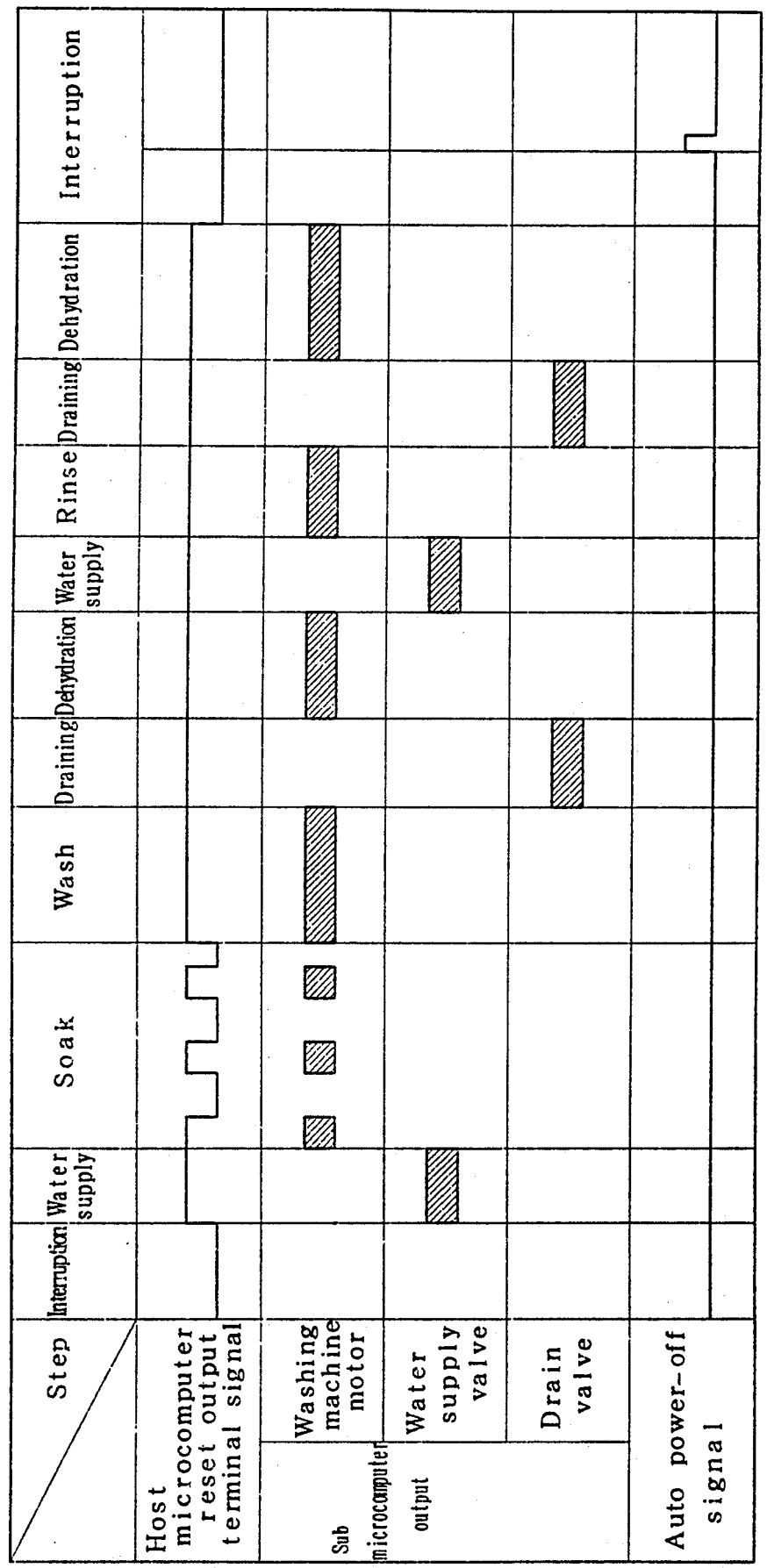
FIG. 2 is a time chart showing an example of the washing operation performed by the washing machine in FIG. 1.
Figure 3:
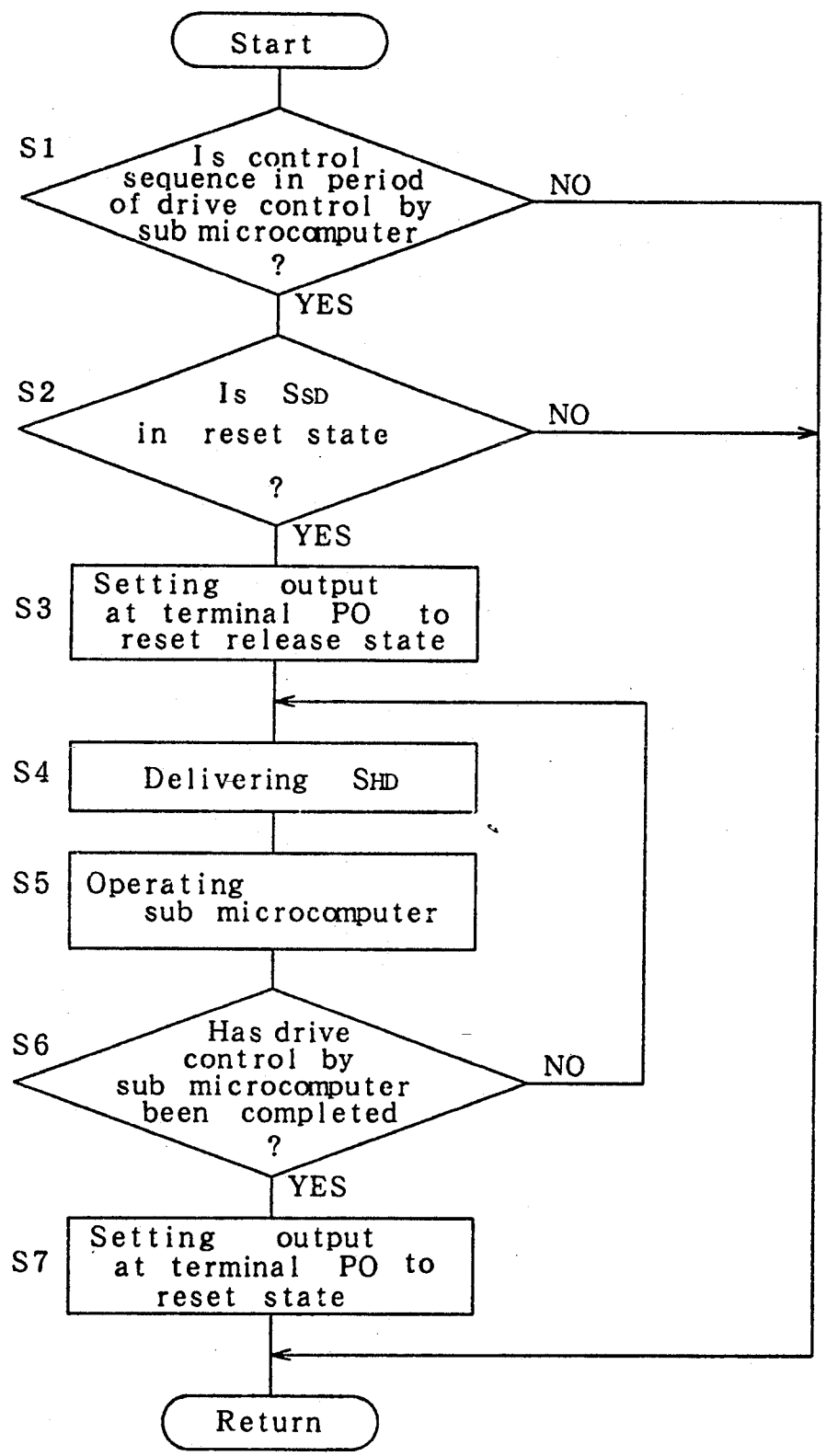
FIG. 3 is a flowchart for explaining the control manner in the washing machine.

A first embodiment of the present invention will be described with reference to FIGS. 1 to 3 of the accompanying drawings. Referring to FIG. 1 showing an electrical arrangement of a fully automatic washing machine, electromagnetically driven water supply and drain valves 2 and 3 each serving as an incorporated electrical equipment and a washing machine motor 4 also serving as the incorporated equipment are connected through respective triacs 5 to 8 and a power supply switch 9 between terminals 1a and 1b of a power supply plug 1 to be connected to a commercial ac power source. The triacs 7, 8 are provided for forward and reverse rotations of the washing machine motor 4, respectively. The power supply switch 9 is provided for a power circuit to which the incorporated electrical equipment such as the valves 2, 3 and the motor 4 are connected. The power supply switch 9 is locked in an on-state and is unlocked into an off-state alternately when operated repeatedly. The power supply switch 9 has a coil 9a and is forced to be unlocked into the off-state when the coil 9a is energized.

A rectifying and smoothing circuit 10 is also connected between the terminals 1a, 1b of the power supply plug 1. A voltage regulating circuit 11 is connected to an output side of the rectifying and smoothing circuit 10. A host microcomputer 12 and a sub microcomputer 13 are connected to an output side of the voltage regulating circuit 11. Reset circuits 14 and 15 are also connected to the output side of the rectifying and smoothing circuit 10. Outputs of the reset circuits 14, 15 are supplied to a reset input terminal RI of the host microcomputer 12 and a reset input terminal RI of the sub microcomputer 13 respectively. The output at a reset output terminal PO of the host microcomputer 12 is also supplied to the reset input terminal RI of the sub microcomputer 13. When an electrical power is supplied to the washing machine, the reset circuits 14, 15 maintain the respective outputs at the low level for an instant and subsequently, maintain the respective outputs at the high level. The microcomputers 12, 13 are reset when the low-level voltage is applied to the respective reset input terminals RI. Each microcomputer is changed from the reset state to the reset release state when the voltage is switched from the low-level to the high-level.

The reset state refers to an initial condition of each microcomputer and the reset release state to the condition that a control command from an outer circuit can be supplied to each microcomputer and each microcomputer is operable in accordance with the control command.

Switch signals are supplied to the host microcomputer 12 from various manually setting switches 16 mounted in a key board (not shown) and the host microcomputer 12 delivers control signals to a display circuit 17. The host microcomputer 12 operates to energize the coil 9a of the power supply switch 9 when a predetermined period of time, for example ten minutes, elapse from the time of completion of the washing operation, as will be described later, thereby returning the power supply switch 9 to the off-state. Clock signals $S_{CK}$, control commands and serial signals $S_{HD}$ as control data are supplied from the host microcomputer 12 to the sub microcomputer 13. A status signal $S_{SD}$ representative of whether or not the sub microcomputer 13 is in the reset state is supplied to the host microcomputer 12 from the sub microcomputer 13. The sub microcomputer 13 controls the triacs 5-8 so that the water-supply valve 2, the drain valve 13 and the washing machine motor 4 are controlled.

The terminal 1a of the power supply plug 1 is connected to one output line of the voltage regulating circuit 11 through the switch 9 and a switch operation detecting circuit 19 comprising two resistances 18a and 18b and a diode 20 with polarity shown in FIG. 1. A capacitor 21 is connected in parallel with the resistances 18a, 18b. A switch operation detection signal is supplied from the common conjunction of the resistances 18a, 18b to the input terminal PI of the host microcomputer 12. Accordingly, a high-level signal is input to the input terminal PI of the host microcomputer 12 when the power supply switch 9 is turned on and a low-level signal is input to the input terminal PI of the host microcomputer 12 when the power supply switch 9 is turned off. When the microcomputer 12 determines from the signal at the input terminal PI that the power supply switch 9 is turned off, the reset output terminal PO is maintained at the low level, that is, the reset signal is delivered. Furthermore, the reset output terminal PO is maintained at the high level or the reset release signal is delivered while any one of the water supply valve 2, drain valve 3 and the washing machine motor 4 is being driven by the host microcomputer 12. Where the reset output terminal PO of the host microcomputer 12 is at the low level (reset state), the reset input terminal RI of the sub microcomputer 13 is maintained at the low level even when the high-level signal representative of the reset release state is delivered from the reset circuit 15, so that the sub microcomputer 13 is maintained at the reset state.

Operation of the above-described arrangement will be described. When the power supply plug 1 is connected to the commercial power source, the operating voltages are supplied to the respective microcomputers 12, 13 from the voltage regulating circuit 11 and subsequently, the high-level reset release signals are delivered from the reset circuits 14, 15. Consequently, the host microcomputer 12 is in the reset release state while the sub microcomputer 13 remains in the reset state since the power supply switch 9 is turned off and the reset signal is delivered from the reset output terminal PO of the host microcomputer 12.

When the power supply switch 9 is turned on for execution of the washing operation, the host microcomputer 12 selects one of operation courses from a washing operation program based on the switch signals from the manually setting switches 16. The host microcomputer 12 controls the display circuit 17 in accordance with the selected operation course and delivers the control commands to the sub microcomputer 13 so that steps shown in FIG. 2, for example, is sequentially executed. In this case the host microcomputer 12 functions as both determination means and reset means and these functions will hereinafter be described with reference to FIG. 3.

In the washing operation, the water supply valve 2 is driven in the water supply step and the drain valve 3 is driven in the water discharge step. The washing machine motor 4 is intermittently driven in a soaking step and continuously driven in each of the wash, dehydration and rinse steps. The above-described driving of the water supply valve 2, the drain valve 3 and the washing machine motor 4 is controlled by the sub microcomputer 13. The host microcomputer 12 determines whether or not the control sequence has reached a stage in which each incorporated electrical equipment is to be controlled by the sub microcomputer 13 (step S1). When determining that the control sequence has reached the stage in which any one of the incorporated electrical equipment 2-4 is to be driven by the sub microcomputer 13, the host microcomputer 12 determines from the status signal $S_{SD}$ whether or not the sub microcomputer 13 is in the reset state (step S2). When determining from the status signal $S_{SD}$ that the sub microcomputer 13 is in the reset state, the host microcomputer 12 delivers the high-level voltage or reset release signal from the reset output terminal PO thereof so that the reset state of the sub microcomputer 13 is released (step S3). When the reset state of the sub microcomputer 13 is released, the status signal $S_{SD}$ is maintained at the high level.

The host microcomputer 12 then delivers the control command $S_{HD}$ to the sub microcomputer 13 (step S4), so that the sub microcomputer 13 is operated to drive the incorporated electrical equipment 2-4 in accordance with the control command (step S5). Upon lapse of the period in which the incorporated electrical equipment 2-4 are driven by the sub microcomputer 13 (step S6), the low-level voltage or reset signal is delivered from the reset output terminal PO of the host microcomputer 12 (step S7). Accordingly, the sub microcomputer 13 is reset and the status signal $S_{SD}$ supplied to the host microcomputer 12 is switched to the reset state signal.

The above-described operation is performed every time the control sequence reaches the stage in which the incorporated electrical equipment are to be driven. The host microcomputer 12 determines the washing operation start time from a detection signal generated by the switch operation detecting circuit 19 with turn-on of the power supply switch 9 to be supplied to the terminal PI of thereof. Determining that ten minutes have elapsed from the completion of the washing operation as described above, the host microcomputer 12 delivers the auto power-off signal to the coil 9a of the power supply switch 9 such that the power supply switch 9 is automatically turned off even if it has not been manually turned off.

Figure 4:
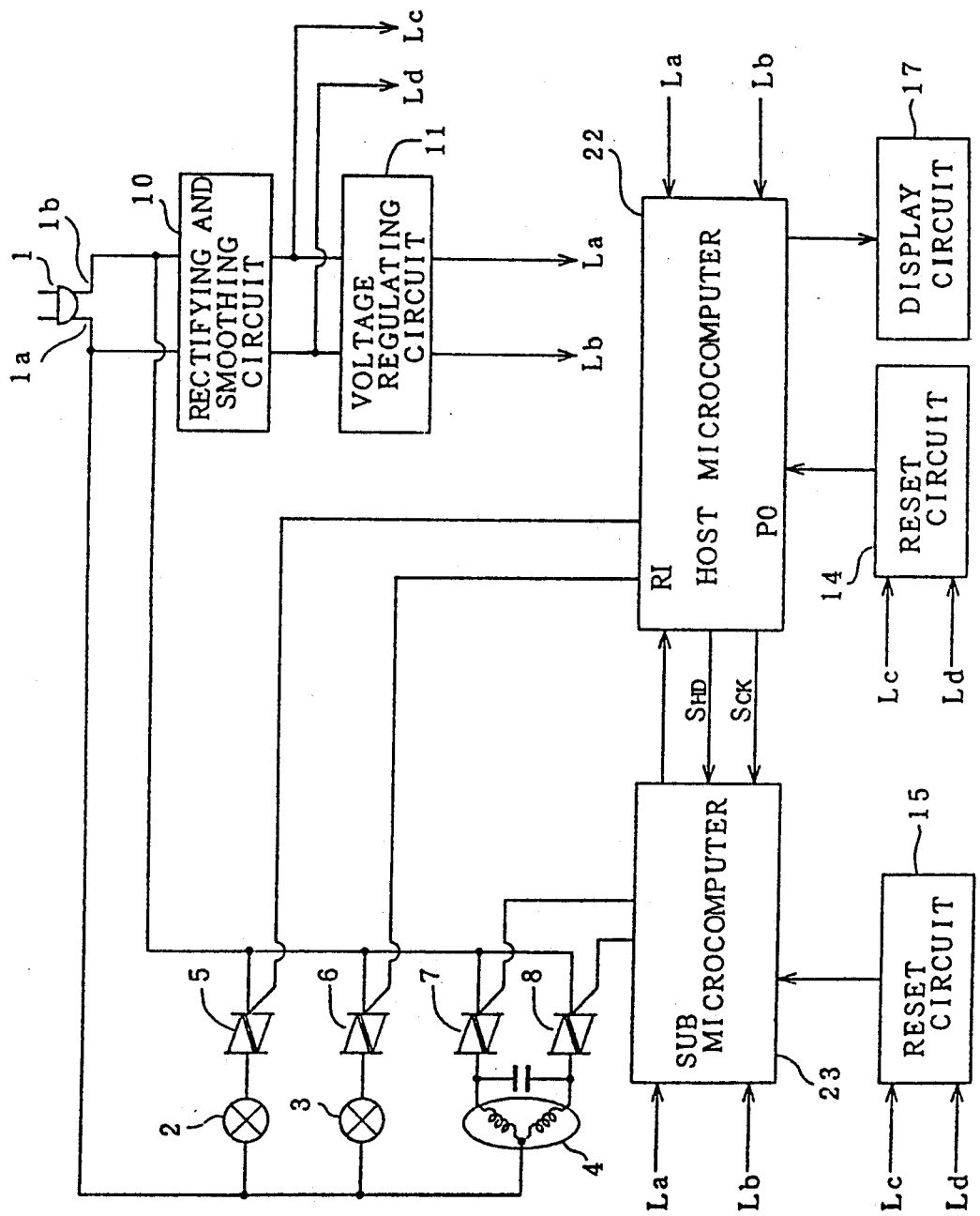
FIGS. 4 and 5 are views similar to FIGS. 1 and 3 showing a second embodiment respectively.
Figure 5:
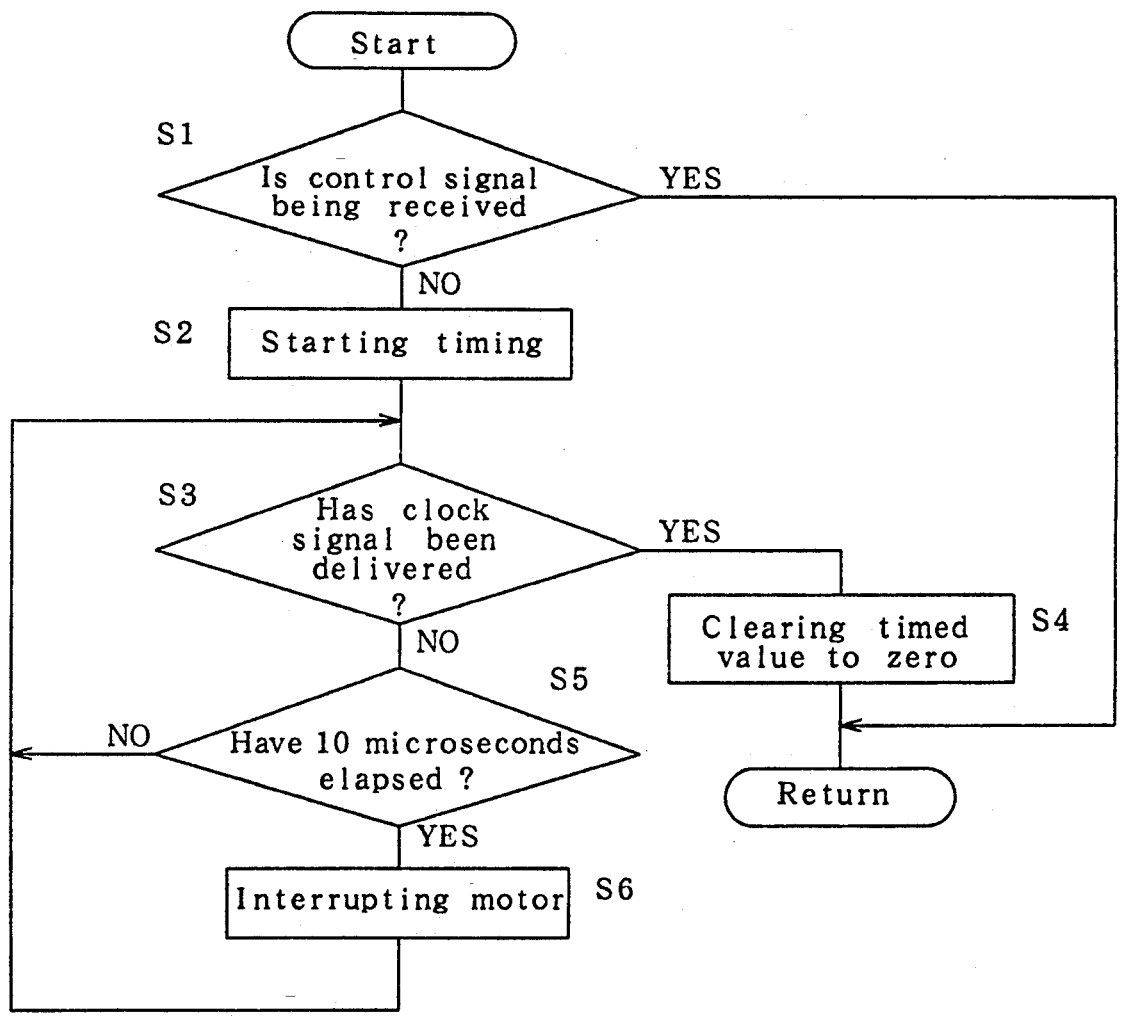

In accordance with the above-described embodiment, the sub microcomputer 13 is maintained in the reset state in the stages of the control sequence other than the stage in which the incorporated electrical equipment are driven by the sub microcomputer 13. Consequently, occurrence of runaway of the sub microcomputer 13 due to noise can be prevented and safety can be secured since the incorporated electrical equipment can be prevented from being inadvertently operated. Furthermore, since the control command is delivered from the host microcomputer 12 after it is confirmed that the sub microcomputer 13 is in the reset state, further safety can be achieved FIGS. 4 and 5 illustrate a second embodiment of the invention. Referring to FIG. 4, the water supply valve 2 and the drain valve 3 are controlled by the host microcomputer 22 while the washing machine motor 4 is controlled by the sub microcomputer 23. The sub microcomputer 23 detects the disconnection of the signal line between the host and sub microcomputers 22, 23 and the runaway of the host microcomputer 22, thereby interrupting the washing machine motor 4. FIG. 5 shows a detection routine of the sub microcomputer 23. In execution of the detection routine, the sub microcomputer 23 first determines whether or not the control command $S_{HD}$ has been delivered thereto from the host microcomputer 22 (step S1). When determining that the control command $S_{HD}$ has not been delivered from the host microcomputer 22, the sub microcomputer 23 starts timing (step S2). The sub microcomputer 23 determines whether or not the clock signal $S_{CK}$ has been delivered thereto from the host microcomputer 22 (step S3). When determining that the clock signal $S_{CK}$ has been delivered from the host microcomputer 22, the sub microcomputer 23 clears the timed value to zero (step S4). These operations of the sub microcomputer 23 as described above are repeated. The sub microcomputer 23 receives the control signal from the host microcomputer 22 to drive the washing machine motor 4 based on the control signal when there is no disconnection in the signal line nor runaway of the host microcomputer 22.

On the other hand, the clock signal $S_{CK}$ cannot be exactly input to the sub microcomputer 23 in the case where there is a disconnection in the signal line or occurrence of the runaway of the host microcomputer 22. In this case the sub microcomputer 23 determines at step S3 that the clock signal has not been delivered thereto from the host microcomputer 22. When the condition that the clock signal is not input to the sub microcomputer 23 continues for a predetermined period of time, for example 10 microseconds (step S5), the sub microcomputer 23 interrupts the washing machine motor 4 where it is being driven or maintains the motor 4 in the off state until the clock signal $S_{CK}$ is normally input to the sub microcomputer 23 where the motor 4 is turned off (step S6).

In accordance with the second embodiment, the sub microcomputer 23 determines that there is a disconnection in the signal line or an occurrence of runaway of the host microcomputer 22, where the clock signal $S_{CK}$ is not delivered to the sub microcomputer 23 from the host microcomputer 22 for the predetermined period of time. The sub microcomputer 23 then interrupts the motor 4. Consequently, the washing machine motor 4 can be prevented from being continuously driven under the condition of the occurrence of the signal line disconnection or runaway of the host microcomputer 22. The motor 4 can also be prevented from being started based on the previously supplied drive command from the host microcomputer 22.

Figure 6:
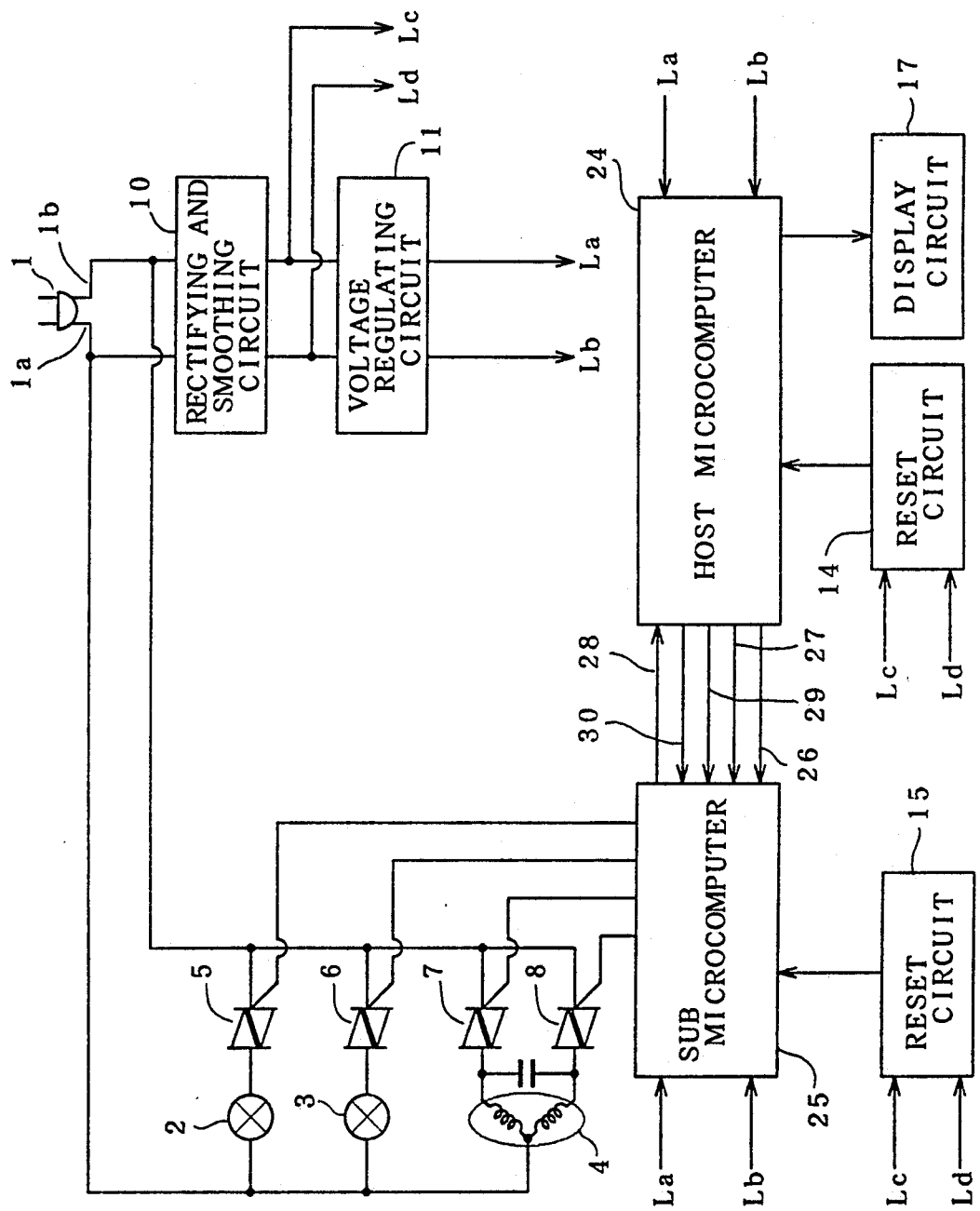
FIGS. 6 and 7 are views similar to FIGS. 1 and 3 showing a third embodiment.
Figure 7:
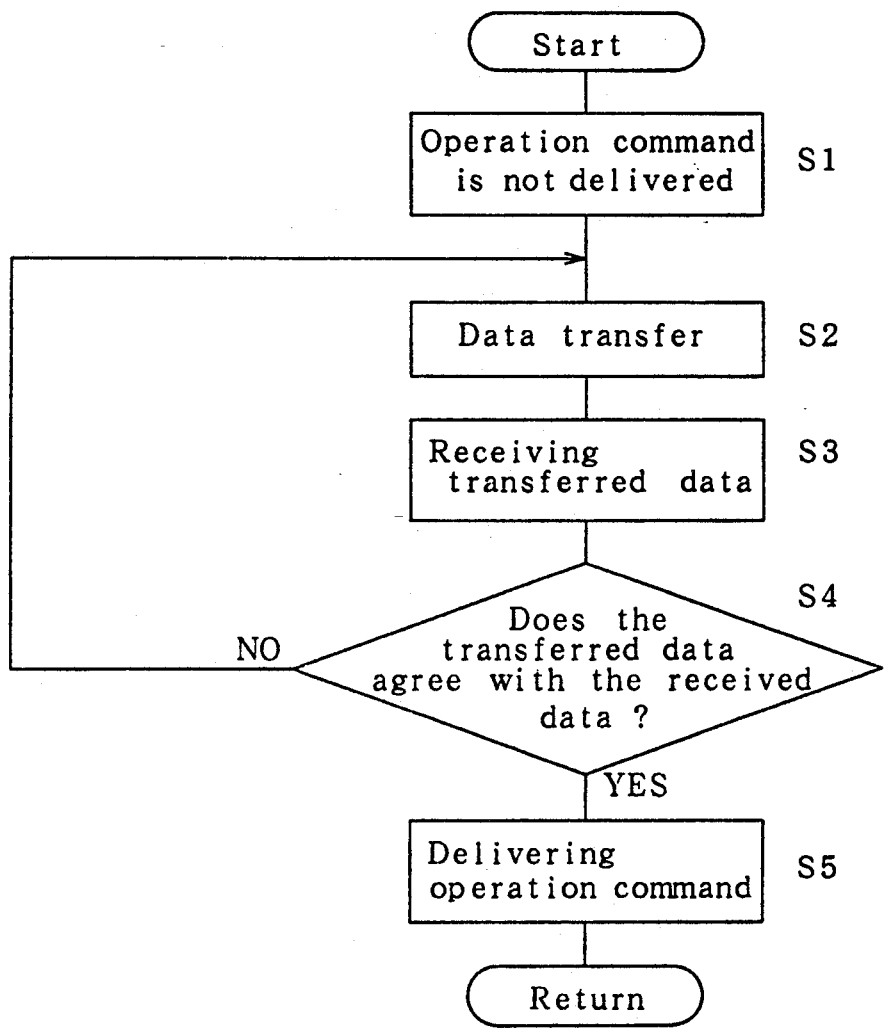

FIGS. 6 and 7 illustrate a third embodiment. The water supply valve 2 and the drain valve 3 are controlled by the host microcomputer 24 and the washing machine motor 4 is controlled by the sub microcomputer 25, as in the second embodiment. The control of the washing machine motor 4 is performed by the sub microcomputer 25 after it is confirmed that the control command has been exactly delivered from the host microcomputer 24 to the sub microcomputer 25. More specifically, as shown in FIG. 6, five signal lines are provided between the host microcomputer 24 and the sub microcomputer 25, that is, a signal line 26 through which a timing signal is transferred from the host microcomputer 24 to the sub microcomputer 25, a signal line 27 through which data or the control command is transferred in the unit of 1 bit in synchronism with the timing signal, a signal line 28 through which data with the same contents as those of the data transferred from the host microcomputer 24 to the sub microcomputer 25 is returned to host microcomputer 24 in the unit of 1 bit, a signal line 29 through which a data return timing signal is delivered so that the timing for returning the data to the host microcomputer 24 is given to the sub microcomputer 25, and a signal line 30 through which the host microcomputer 24 delivers the operation command so that the sub microcomputer 25 initiates its operation in accordance with the control command.

Now referring to FIG. 7, the host microcomputer 24 delivers the control command data to the sub microcomputer 25 (step S2) in the condition that the operation commands for driving the incorporated electrical equipment are not generated (step S1). Then, the sub microcomputer 25 returns the data with the same contents as those of the delivered control command data to the host microcomputer 24 and the host microcomputer 24 receives the data returned from the sub microcomputer 25 (step S3). The sub microcomputer 25 thus serve s as data returning means. Then, the host microcomputer 24 determines whether or not the control command data delivered to the sub microcomputer 25 agrees with the data returned thereto from the sub microcomputer 25 (step S4). When determining that the delivered control command data agrees with the returned data, the host microcomputer 24 delivers the operation command, which command is received by the sub microcomputer 25. The sub microcomputer 25 then drives and controls the washing machine motor 4 in accordance with the operation and control commands.

On the other hand, when determining that the delivered data does not agree with the returned data (step S4), the host microcomputer 24 redelivers the data to the sub microcomputer 25 and delivers the operation command to the same when all the transferred data agrees with the returned data.

In accordance with the third embodiment, the sub microcomputer 25 is arranged to start controlling the washing machine motor 4 after it is confirmed that the contents of the control command delivered to the sub microcomputer 25 from the host microcomputer 24 are correct. Consequently, the sub microcomputer 25 can be prevented from starting its operation in accordance with an error control command and the safety can be secured.

Figure 8:
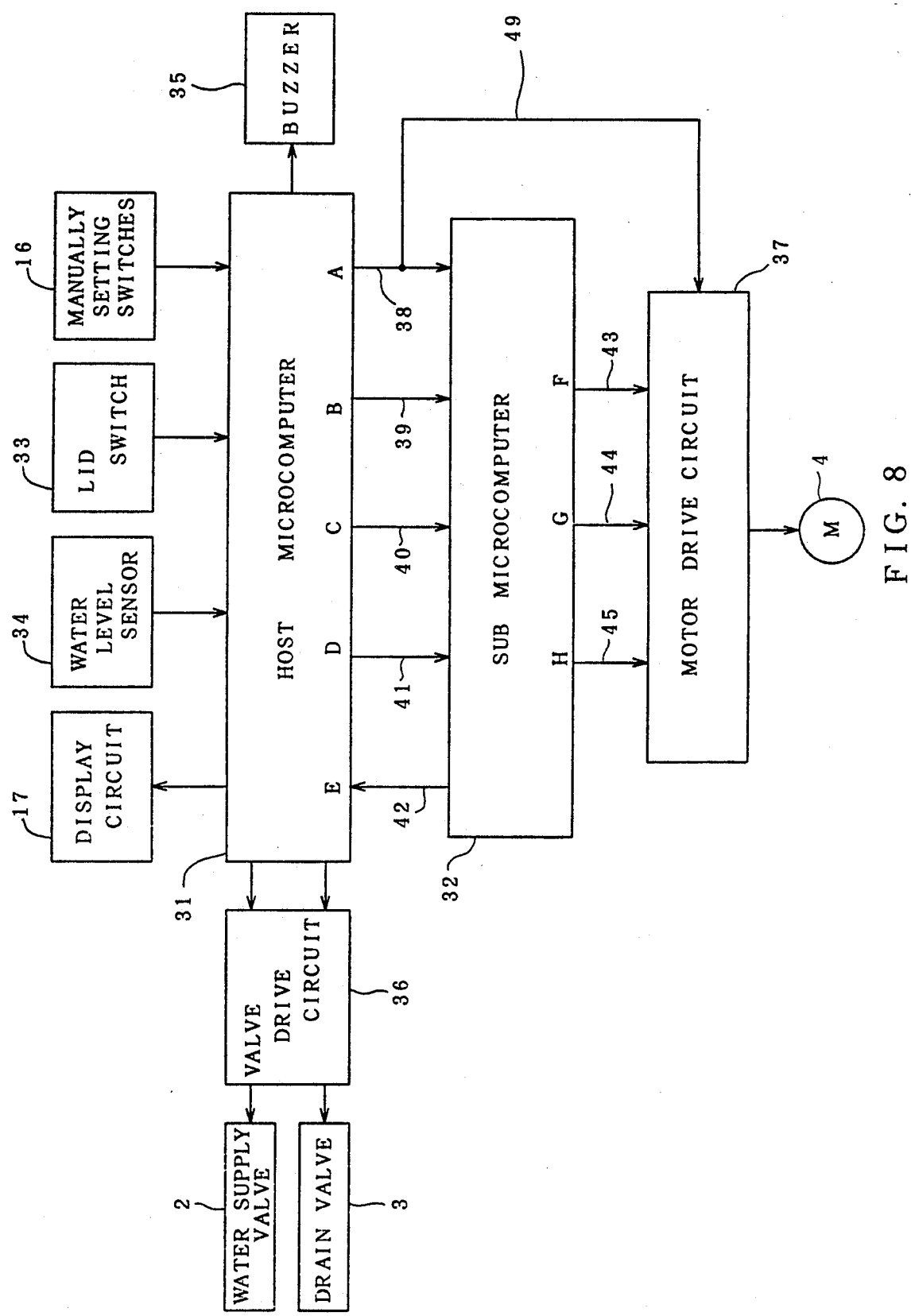
FIG. 8 is a view similar to FIG. 1 showing a fourth embodiment.
Figure 9:
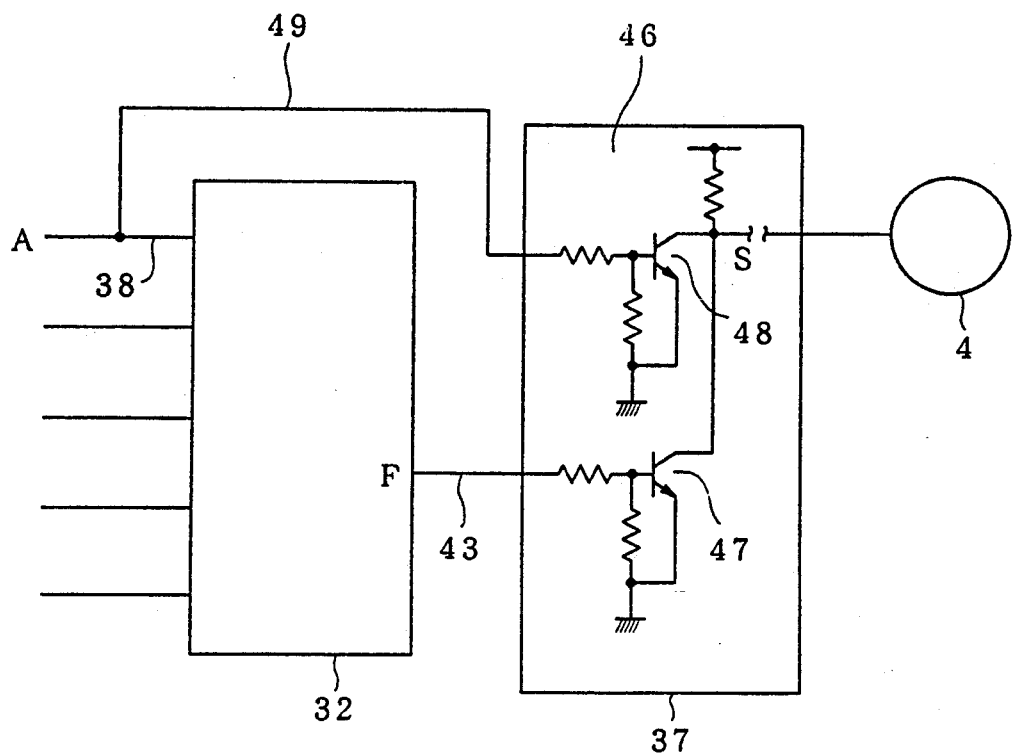
FIG. 9 is a detailed circuit diagram showing a part of the drive circuit in FIG. 8.
Figure 10:
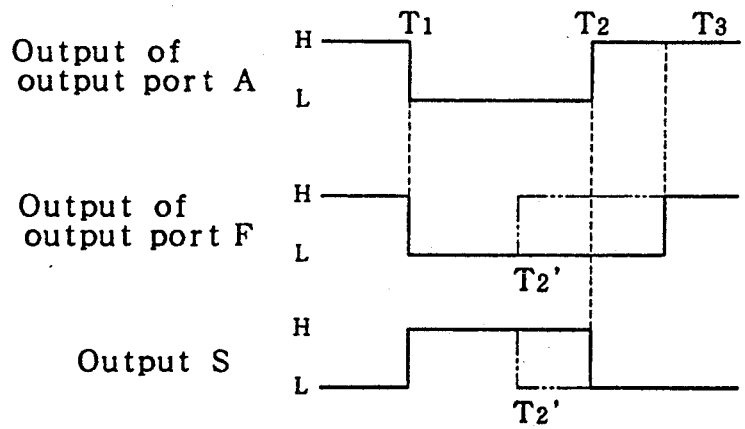
FIG. 10 is a time chart showing the washing operation performed by the washing machine including the device in FIG. 9.

FIGS. 8 to 10 illustrate a fourth embodiment of the invention. In this embodiment the running of the washing machine motor is prevented from being unable to be interrupted because of runaway of the sub microcomputer. FIG. 8 schematically shows an electrical arrangement of the washing machine of the fourth embodiment. The mechanical construction of the washing machine in this embodiment is the same as of the conventional washing machine. More specifically, a rotatable tub (not shown) for containing clothes to be washed is provided in an outer cabinet (not shown). The washing machine further includes the water supply valve 2 for supplying water into the rotatable tub and a drain valve for discharging the water from the rotatable tub. An agitator (not shown) is mounted in the rotatable tub for creation of washing streams. The agitator is rotated by the washing machine motor 4 as the incorporated electrical equipment in the wash step. The rotatable tub and the agitator are rotated by the motor 4 in the dehydration step. The manually setting switches 16 including a selecting switch and a start switch neither shown and the display circuit 17 are mounted in the top of the outer cabinet.

The switch signals from the manually setting switches 16 are input to the host microcomputer 31. The host microcomputer 31 is also supplied with detection signals from a lid switch 33 for detecting closure and opening of a lid (not shown) mounted on the top of the outer cabinet and from a water level detector 34. Based on these input signals, the host microcomputer 31 controls a buzzer 35 producing a keying sound, a warning sound and the like and the display circuit 17 in accordance with a previously stored program and further controls the water supply valve 2 and the drain valve 3 via a valve drive circuit 36. Furthermore, the host microcomputer 31 delivers the operation command for running the motor 4 to the sub microcomputer 32. The sub microcomputer 32 delivers the operation command to a motor drive circuit 37 driving the motor 4, based on the operation command delivered thereto from the host microcomputer 31. The motor drive circuit 37 comprises an inverter circuit and performs the drive and interruption of the motor 4, control for switching between the forward and reverse rotations of the motor 4, and control of the voltage applied to the motor 4 (rotational speed control in revolutions).

Five signal lines 38–42 are provided between the host and sub microcomputers 31, 32. The operation command for running the motor 4 is supplied from a predetermined output port A of the host microcomputer 31 to the sub microcomputer 32 through the signal line 39. A data transfer timing instruction signal is supplied from the host microcomputer 31 to the sub microcomputer 32 through the signal line 39. A data transfer timing clock signal is supplied from the host microcomputer 31 to the sub microcomputer 32 through the signal line 40. Furthermore, the signal lines 41, 42 are serial data lines. Serial 8-bit data, for example, is transferred from host microcomputer 31 to the sub microcomputer 32 through the signal line 41 and from the sub microcomputer 32 to the host microcomputer 31 through the signal line 42.

The sub microcomputer 32 is connected to the motor drive circuit 37 through three signal lines 43 to 45. The control command for controlling the drive and interruption of the motor 4 is generated from a predetermined output port F of the sub microcomputer 32 to be transferred to the motor drive circuit 37 through the signal line 43. The forward and reverse rotation control command and the voltage (the number of revolution of the motor 4) control command are supplied to the motor drive circuit 37 through the signal lines 44, 45 respectively. As a result, the washing machine motor 4 is controlled by the sub microcomputer 32 through the motor drive circuit 37 in accordance with the program incorporated in the host microcomputer 31 so that a predetermined washing operation is performed by the motor 4 in its cooperation with the water supply and drain valves 2, 3.

The above-mentioned motor drive circuit 37 includes a gate circuit 46 serving as operation interrupting means. Referring to FIG. 9, the gate circuit 46 comprises a NOR circuit including two transistors 47 and 48. The signal from the output port F of the sub microcomputer 32 is supplied to the base of the transistor 47 through the signal line 43. The signal from the output port A of the host microcomputer 31 is supplied to the base of the transistor 48 through the signal line 49 diverged from the signal line 38. When the control sequence reaches the stage in which the motor 4 is to be operated, the low level signal is delivered from the output port A of the host microcomputer 31. The signal at the output port F of the sub microcomputer 32 is switched to the low level for drive of the motor 4 and switched to the high level for interruption of the motor 4 at $T_2$ or $T_2'$ in FIG. 10. The motor drive circuit 37 is arranged so as to run the motor 4 when the output S of the gate circuit 46 is at the high level and to interrupt the motor 4 when the gate circuit 46 output S is at the low level. Accordingly, the gate circuit 46 output S is at the high level only while the low level signals are being delivered from both of the output port F of the sub microcomputer 32 and the output port A of the host microcomputer 31 (the period between $T_1$ and $T_2'$ or $T_2$), as shown in FIG. 10, thereby running the motor 4. The motor 4 is interrupted by the gate circuit 46 when the logical output value of the output port A of the host microcomputer 31 differs from the logical output value of the output port F of the sub microcomputer 32.

In operation, the motor 4 is rotated alternately in the forward and reverse directions so that the agitator is forward and reverse rotated to produce the washing streams when the washing operation is initiated. The motor 4 is also operated to rotate the tub containing the clothes to be washed in the dehydration operation. In this case the motor 4 is operated in accordance with the program stored in the host microcomputer 31 in response to the inputs from the manual switches 16. The motor 4 drive and interruption commands, data of forward and reverse rotations and the number of revolutions of the motor 4 are transferred from the host microcomputer 31 to the sub microcomputer 32. Based on these commands and data, the motor 4 drive and interruption control commands, forward and reverse rotation control commands and voltage control command are supplied to the motor drive circuit 37 from the sub microcomputer 32. The drive and interruption of the motor 4 performed by the gate circuit 46 of the motor drive circuit 37 are based on both the control commands from the sub microcomputer 32 and the control command delivered from the host microcomputer 31. More specifically, the output S of the gate circuit 46 is at the high level only while the low level signals or commands to be executed are being delivered from both the output port F of the sub microcomputer 32 and the output port A of the host microcomputer 31 (the period between $T_1$ and $T_2$ or the period between $T_1$ and $T_2'$), thereby running the motor 4. When the interruption command is delivered from the host microcomputer 31 to the sub microcomputer 32 at time $T_2$, for example during running of the motor 4, the output port F of the sub microcomputer 32 is switched to the high level and accordingly, the output S of the gate circuit 46 is switched to the low level, which interrupts the motor 4.

In the occurrence of runaway of the sub microcomputer 32, the control command low-level signal is continuously delivered from the output port F of the sub microcomputer 32 to the motor drive circuit 37 (the period between $T_2$ and $T_3$ in FIG. 10) even when the sub microcomputer 32 ceases to receive the control commands from the host microcomputer 31. In this case, however, the motor 4 is interrupted by the gate circuit 46 irrespective of the output level at the output port F of the sub microcomputer 32 since the signal on the signal line 49 is switched to the high level at time $T_2$ because of completion of the stage of the running of the motor 4. Consequently, the abnormal operation of the motor 4 can be prevented if the runaway of the sub microcomputer 32 should occur.

Figure 11:
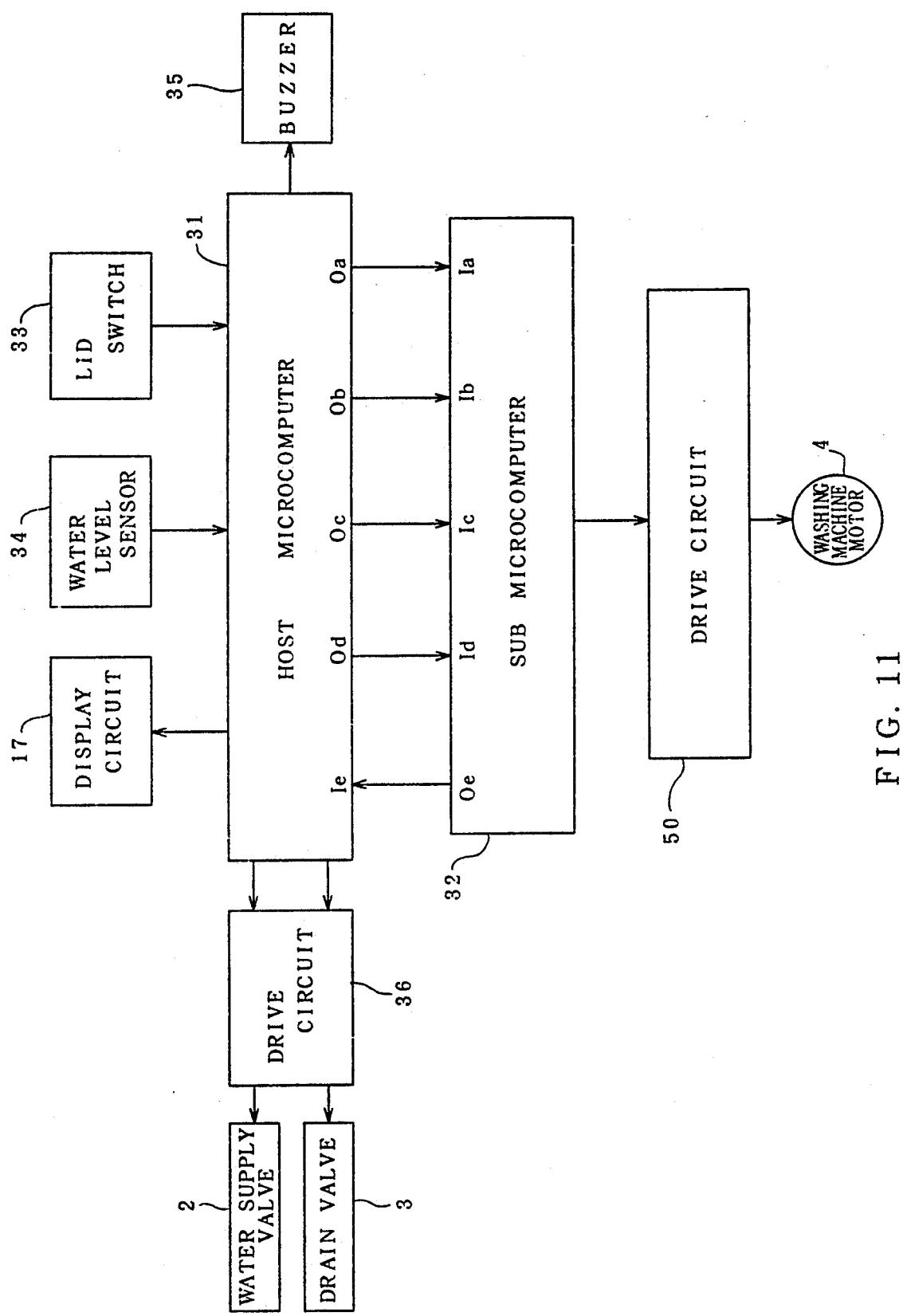
FIG. 11 is a view similar to FIG. 1 showing a fifth embodiment.
Figure 12:
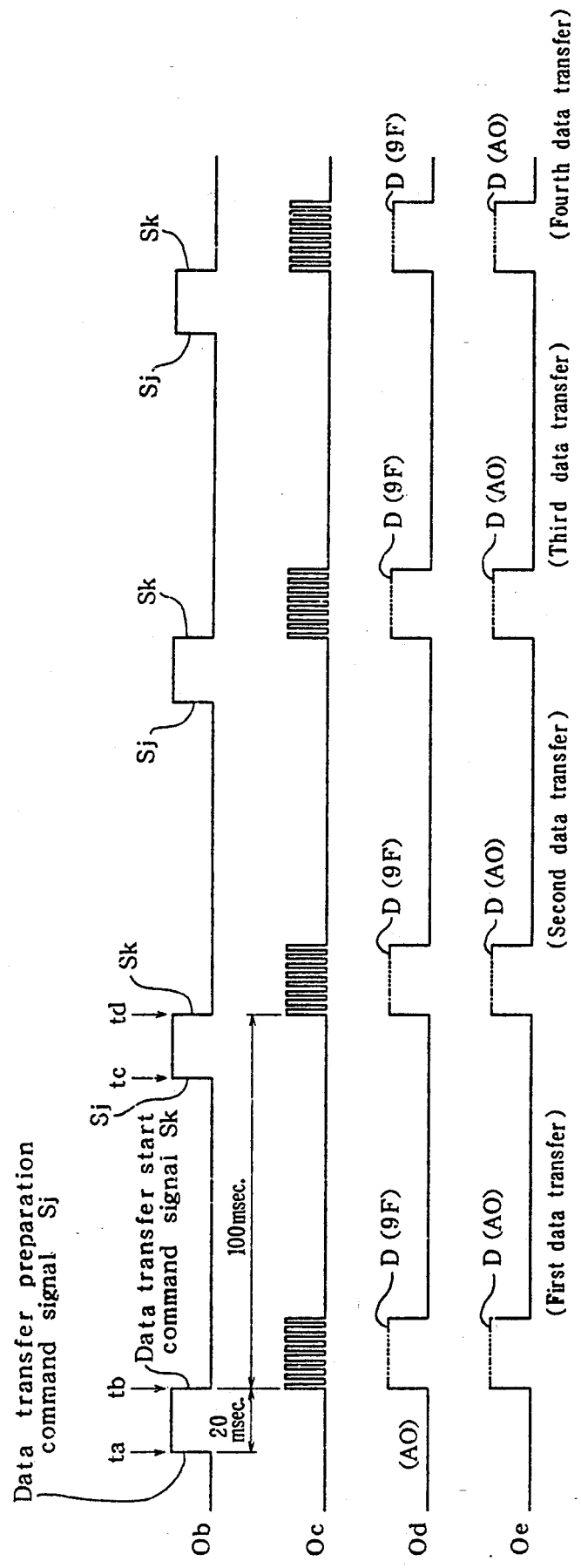
FIG. 12 is a time chart showing the washing operation performed by the washing machine including the device in FIG. 11.

FIGS. 11 and 12 illustrate a fifth embodiment of the invention. The hardware arrangement shown in FIG. 11 is the same as shown in FIG. 8 except for a drive circuit 50, so that the same reference numerals are employed in FIG. 11 as those in FIG. 8

The data transfer between the microcomputers 31, 32 will be described. The host microcomputer 31 delivers data D from a data output port Od intermittently, for example in the intervals of 100 microseconds, and clock pulses from an output port Oc in the same timing as the data D, as shown in FIG. 12. A predetermined period before output of the data D, for example 20 microseconds before it, a data transfer preparation command signal $S_j$ (corresponding to a rising portion of the pulse) is delivered from the output port Ob of the host microcomputer 31. A data transfer start command signal $S_k$ (corresponding to the trailing edge portion of the pulse) is delivered from the output port Ob further 20 microseconds after the delivery of the data transfer preparation command signal $S_j$. The data D and the clock pulses are delivered in synchronism with the data transfer start signal $S_k$.

When supplied with the data transfer preparation command signal $S_j$, the sub microcomputer 32 is arranged to input the data D thereafter. Subsequently, the previous data D is canceled by the present data D following the data transfer preparation command signal $S_j$. The sub microcomputer 32 converts the input serial data D to every 8-bit code or a command in the timing of the input clock pulses. The input data D is transferred to a first storage section of an internal memory of the sub microcomputer 32 and the previously input data D is transferred to a second storage section from the first storage section to be stored therein. Start and stop, speed change and forward and reverse rotation timing of the motor 4 are controlled in accordance with contents of the data D stored in the first storage section of the internal memory. The host microcomputer 32 repeatedly transfers the data D with the same contents to the sub microcomputer 32 in the above-described period intermittently until the contents of the data D is changed. The sub microcomputer 32 is adapted to determine the change of the contents of the data D transferred thereto from the host microcomputer 31. The host microcomputer 31 is adapted to determine whether or not the data D has been transferred to the sub microcomputer 32.

The operation of the washing machine will be described with description of the above-described determining functions of the microcomputers. Now, consider the case where the sub microcomputer 32 has previously supplied with the data D containing the motor interruption data A0 from the host microcomputer 31 with respect to the motor 4 start and interruption control and the present data D containing the motor start data 9F is to be transferred to the sub microcomputer 32 from the host microcomputer 31. The host microcomputer 31 delivers the data transfer preparation command signal $S_j$ to the sub microcomputer 32 at time $T_a$, 20 microseconds before delivery of the data D. When supplied with the data transfer preparation command signal $S_j$ at the input port Ib, the sub microcomputer 32 inputs the data D thereafter. The host microcomputer 31 delivers the data transfer start command signal $S_k$ at time $T_b$ and simultaneously, delivers the data D containing the motor start data 9F from the output port Od and the 8-bit clock pulses from the output port Oc. The sub microcomputer 32 inputs the present data D containing the data 9F in synchronism with the clock pulses to store in the first storage section. The data D containing the data A0 previously stored in the first storage section is transferred to the second storage section. The data D containing the data A0 before the previous data at the second storage section is delivered from the output port Oe to the input port Ie of the host microcomputer 31 simultaneously with input of the data transfer start command signal $S_k$. The data transfer preparation command signal $S_j$ is delivered from the host microcomputer 31 at time $T_c$ and the data transfer start command signal $S_k$, the data D containing the data 9F and the clock pulses are delivered from the host microcomputer 31 at time $T_d$. The above-described control is repeated.

The sub microcomputer 32 determines that the contents of the command have been changed when the first data D from the host microcomputer 31 wherein the data A0 has been changed to the data 9F agrees with the following second data D so that the sub microcomputer 32 can be prevented from responding to the data change due to noise. The sub microcomputer 32 performs the control based on the changed data. On the other hand, the host microcomputer 31 determines that the data transfer has been duly performed when the return data D from the sub microcomputer 32, the fourth data in this case, agrees with the previous data.

Now consider the case where any part of the data D transferred from the host microcomputer 31 is missing for some reason or the data D contains error data for some reason. In this case the data D transferred from the host microcomputer 31 is input to the sub microcomputer 32. However, when supplied with the following data transfer preparation command signal $S_j$, the sub microcomputer 32 thereafter inputs the data D and the previous defective data is canceled by the present data D supplied to the sub microcomputer 32 after input of the data transfer preparation command data $S_j$. Consequently, the data input in the sub microcomputer 32 can be promptly recovered to the normal condition. More specifically, consider the case where not 8-bit but 7 or less bit data D is input to the sub microcomputer 32 per input. In this case, if the data transfer preparation command signal should not be input to the sub microcomputer 32, there would be no pause between each data D and its subsequent data D and the sub microcomputer 32 would input the previous defective data short of bits and some bits of the following data compensating for the short bits of the previous data as one instruction, continuing such an error data input. However, when supplied with the data transfer preparation signal $S_j$, the sub microcomputer 32 inputs the data D after the signal $S_j$. Consequently, occurrence of the above-described error data input can be prevented after the subsequent reception of the signal $S_j$ and the washing machine motor 4 can be prevented from being abnormally operated.

Furthermore, since the host microcomputer 31 delivers the data transfer preparation command signal $S_j$, the data transfer start command signal $S_k$ and the data D intermittently, other data processing can be performed by the host microcomputer 31 while these signals and data are not being transferred to the sub microcomputer 32. Consequently, the data processing capability can be improved.

Since the data transfer preparation command signal $S_j$ and the data transfer start command signal $S_k$ are transferred through a common signal line from the output port Ob, the circuit arrangement can be simplified.

The foregoing disclosure and drawings are merely illustrative of the principles of the present invention and are not to be interpreted in a limiting sense. The only limitation is to be determined from the scope of the appended claims.

We claim:

1. An operation control device for a washing machine incorporating electrical equipment such as a motor and electromagnetic valves, the operation control device comprising a sub microcomputer for controlling the equipment incorporated in the washing machine and a host microcomputer supplying control commands to the sub microcomputer to control the same the host microcomputer including first means for determining whether or not a control sequence of the washing machine has reached a stage where the incorporated equipments are to be controlled by the sub microcomputer, second means for supplying a reset signal to the sub microcomputer to reset the same when a result obtained by the first means signifies a negative, and third means for supplying a reset release signal to the sub microcomputer when the control sequence has reached the stage where the incorporated equipment is to be controlled by the sub microcomputer, thereby releasing the sub microcomputer from the reset state.

2. An operation control device according to claim 1, wherein the sub microcomputer includes fourth means for determining whether or not interruption of signal transmission from the host microcomputer to the sub microcomputer is continuous for a predetermined period of time and fifth means for interrupting operation of the incorporated equipment when a result obtained by the fourth means is an affirmative.

3. An operation control device according to claim 2, wherein the fourth means of the sub microcomputer determines whether or not interruption of transfer of clock signals from the host microcomputer to the sub microcomputer is continuous for the predetermined period of time.

4. An operation control device for a washing machine incorporating electrical equipment such as a motor and electromagnetic valves, the operation control device comprising a sub microcomputer having a plurality of output ports for controlling the electrical equipment, a host microcomputer supplying control commands to the sub microcomputer to control the same, the host microcomputer having a plurality of output ports, and interruption means monitoring an output logical value of one of the output ports of the host microcomputer and a logical output value of one of the output ports of the sub microcomputer for determining whether or not each of the host and sub microcomputers is in an abnormal condition, the interruption means interrupting operation of the incorporated electrical equipment when determining that either of the host and sub microcomputers is in the abnormal condition, the interruption means being configured in a circuit independent from both of the host and sub microcomputers.

5. An operation control device according to claim 4, wherein the interruption means monitors a signal from the output port from which the host microcomputer supplies the control command to the sub microcomputer and an output signal from the output port from which the sub microcomputer supplies the control signal to the electrical equipment.

6. An operation control device for a washing machine incorporating electrical equipment such as a motor and electromagnetic valves, the operation control device comprising a sub microcomputer for controlling the electrical equipment, the sub microcomputer having a plurality of input and output ports, a host microcomputer having a plurality of input and output ports, the host microcomputer sequentially transferring serial data from a predetermined one of the output ports thereof to a predetermined one of the input ports of the sub microcomputer, the host microcomputer including means for supplying data transfer preparation command signals from the output ports other than the predetermined output port to the input ports of the sub microcomputer other than the predetermined output port prior to the data transfer to the predetermined input port of the sub microcomputer, the sub microcomputer including means for inputting input data after the data transfer preparation command signal is supplied thereto.

7. An operation control device according to claim 6, wherein a data transfer timing signal is generated by the host microcomputer following output of the data transfer preparation command, the host microcomputer inputs the input data at a timing represented by the data transfer timing signal, and a rising portion and a trailing edge portion of a single pulse signal compose the data transfer preparation signal and the data transfer timing signal respectively.

* * * * *